Figure 1:
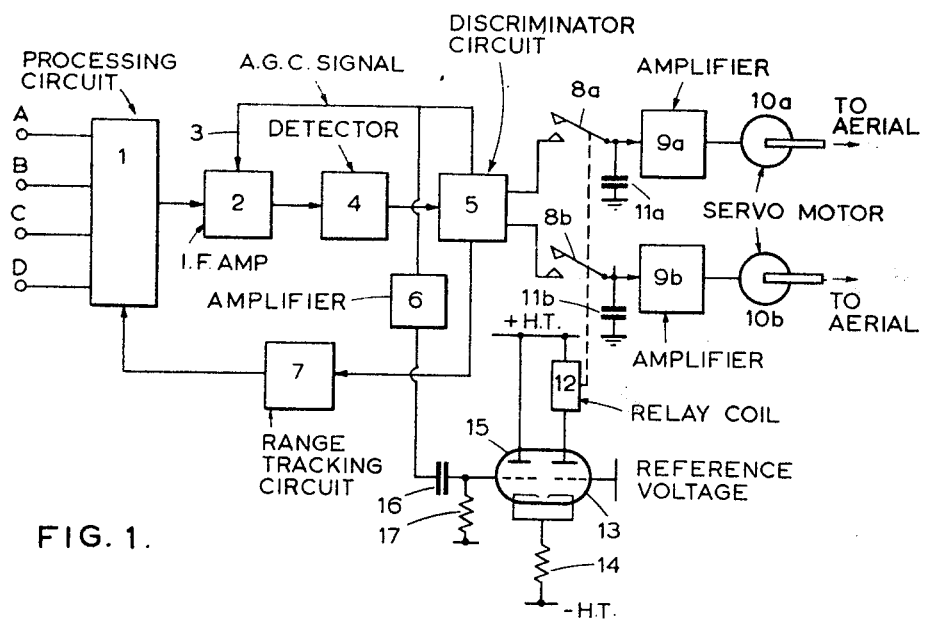

United States Patent Office 3,432,854
Patented Mar. 11, 1969

3,432,854
RADAR APPARATUS
Peter Frederic Thomas Cryer Stillwell, Aylesbury, Peter Murdo Montgomery, Thames Ditton, and Richard William Hogg, Farnborough, England, assignors to Electric & Musical Industries Limited, Hayes, Middlesex, England, a company of Great Britain,
Filed Nov. 19, 1959, Ser. No. 854,197
Claims priority, application Great Britain, Nov. 22, 1958, 37,681/58
U.S. Cl. 343—7.4           6 Claims
Int. Cl. G01s 9/50

This invention relates to radar apparatus, and in particular to radar automatic tracking apparatus.

In one form of radar apparatus, so called static beam splitting is employed to facilitate the generation of error signals for use in automatic tracking circuits. Such apparatus has an aerial comprising a paraboloid reflector having four feeders the apertures of which are disposed symmetrically about the focus of the reflector, so that each feeder has a "squinted" polar diagram whilst their combined polar diagram is "straight ahead." When a radar pulse has to be transmitted, the reflector is irradiated simultaneously from the four feeders and if the pulse is reflected from a direction off the axis of the reflector, the signals received by the individual feeders have different amplitudes. Moreover their relative amplitudes contain the required directional information. By selectively changing the phase of the signals received by the individual feeders and thereafter combining them by means of hybrid or directional couplings, a sum signal and two difference signals are obtained at radio frequency, which signals are a measure of the angular displacement of the target from the axis of the reflector about two axes which are perpendicular to each other and to the reflector axis. The sum and difference signals are then processed, as described for example in United States copending application Ser. No. 699,574, now Patent No. 3,050,724, to provide error signals which can be applied to the automatic tracking circuits which respectively operate to displace the aerial angularly about said two perpendicular axes. In the processing referred to, the sum signal, or a signal derived therefore is used inter alia to provide automatic gain control in the sense that the difference signals are divided by the sum signal so as to reduce the effect of signal amplitude fluctuations which would otherwise tend to cause the sensitivity of the tracking circuits to vary.

With radar apparatus of the form described in the preceding paragraph, it is sometimes found that the tracking circuits tend to maintain the aerial directed to one side or the other of an echo source, a phenomenon which is known as "glint." It is considered by the inventors that this phenomenon arises because the echo source may not be a coherent reflecting surface and may for example act as two or more spaced elementary reflectors. Furthermore the path length to the aerial from the elementary reflectors may be different, depending upon the attitude of the echo source and bearing in mind that a wavelength of the order of centimeters may be used, the signals received from individual elementary reflectors may exhibit phase differences. This tends to falsify the aforesaid sum signal and also the difference signals because in the formation of these signals no allowance can be made for phase differences which are caused by path differences from the elementary reflectors. For example the inventors have found that when an echo source changes its attitude with respect to the aerial, the amplitude of the sum signal exhibits periodic dips corresponding to relatively sudden reductions in the signal amplitudes, which are apparently due to destructive interference between echoes from different elementary reflectors. The inventors have also found that during the occurrence of these dips, and for the same reason, the error signal exhibits spurious transients of substantially greater amplitude than the error signal prevailing between the occurrence of the dips. The error signals are usually integrated in the respective automatic tracking circuits, and the integrated effect of the spurious transients may be sufficiently large to cause the axis of the aerial to be directed to one side or other of the true line of sight to the echo source, thereby producing the glint phenomenon referred to above.

The object of the present invention is to reduce errors in automatic tracking due to glint, and according to the present invention there is provided radar automatic tracking apparatus wherein the error signal for an automatic tracking circuit is weighted in response to the amplitude of received signals in such a way that falsification of the error signal due to glint is reduced.

The signal used for automatic gain control may be employed for producing the required weighting of the error signal.

In apparatus in which tracking is effected about two axes, and individual tracking circuits are provided for the two axes, the error signals for the respective tracking circuits may both be weighted in response to the amplitude of received signals.

According to one form of the present invention, the tracking circuits are disconnected from the error signal channels when a rapid reduction occurs in the amplitude of received signals, such as corresponds to one of the dips already mentioned.

Figure 2:
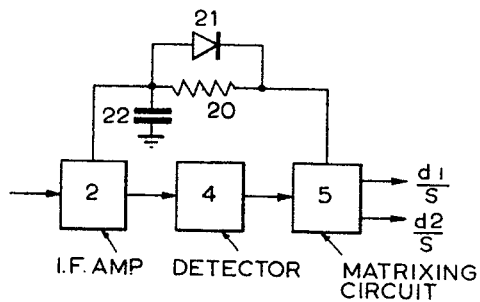

In order that the present invention may be clearly understood and readily carried into effect, the invention will now be described with reference to the accompanying drawings, in which:

FIGURE 1 illustrates diagrammatically, and mainly in block form, one example of radar automatic tracking apparatus according to the present invention, and FIGURE 2 illustrates a modification of FIGURE 1.

Referring to the drawing, it will be assumed that the apparatus illustrated in FIGURE 1 operates on the static beam splitting technique and that when a reflection is received by the aerial four signals are received by the individual feeders, said signals being denoted herein as A, B, C and D respectively. It will be understood by those skilled in the art that the signal $(A+B)-(C+D)$ is dependent upon the angular misalignment of the aerial about one axis and that the signal $(A+C)-(B+D)$ is dependent upon the angular misalignment of the aerial about another axis perpendicular to the first, both said axes being perpendicular to the reflector axis. The two signals which are dependent upon angular misalignment will be denoted as $d_1$ and $d_2$ respectively. Furthermore the signal $A+B+C+D$ is dependent upon the range of the target and will be denoted herein as S. It will be understood moreover that the signals $d_1$ and $d_2$ are also dependent on S. The signals A, B, C and D are applied to a processing circuit 1 in which the respective signals are converted to intermediate frequency signals and processed in such other ways that the output from the processing circuit, in response to each reflected pulse received by the aerial, consists of a group of four successive pulses of which the amplitudes represent respectively $d_1+S$, $d_1-S$, $d_2+S$ and $d_2-S$. The processing circuit may be of the form described in the aforesaid patent application and will not be further described herein.

Output signals from the processing circuit 1 are applied to an intermediate frequency amplifier 2 which is a variable gain amplifier and has its gain controlled by an A.G.C. signal applied by means of a lead 3. Assume that the gain of the amplifier 2 is G. The group of four pulses in the output of the amplifier and corresponding to each received pulse therefore have amplitudes representing $(d_1+S)G$, $(d_1-S)G$, $(d_2+S)G$ and $(d_2-S)G$. Output signals from the amplifier 2 are then applied to a detector circuit 4 which demodulates the intermediate frequency signals and produces so called video signals. The detector 4 is not phase sensitive and so the video signals which are derived from it are the moduli of the aforesaid quantities and since $(d_1-S)G$ and $(d_2-S)G$ are always negative relative to $(d_1+S)G$ and $(d_2+S)G$, the corresponding video signal can be taken to represent $-(d_1-S)G$ and $-(d_2-S)G$ respectively. The output of the detector circuit is in turn applied to a discriminator circuit 5. One output from the discriminator circuit 5 corresponds to the first of the group of pulses, and that output is applied to an automatic range tracking circuit 7 which may be of conventional construction. The output of the range tracking circuit consists of pulses which, in known manner, occur at the anticipated time of arrival at the aerial of successive echo pulses from a single target, and such pulses from the range tracking circuit are applied to operate range gates in the processing circuit 1 in known manner. The discriminator circuit 5 also produces two signals representing respectively $2d_1G$ and $2d_2G$, which are responsive to the angular misalignment of the aerial about the two aforesaid axes. The first of these output signals is produced by differencing the video pulses representing $(d_1+S)G$ and $-(d_1-S)G$ and the second is produced by differencing the video pulses representing $(d_2+S)G$ and $-(d_2-S)G$. The discriminator circuit 5 is also arranged to produce an automatic gain control signal by summing the video pulses. The automatic gain control signal represents 4SG and it is applied by means of the lead 3 to a control electrode in the amplifier 2, where it is subtracted from a reference bias voltage. It can be shown that on this condition, and provided that the gain of the amplifiers is sufficiently high, G will tend to a value proportional to $1/S$.

The angular error signals, which can therefore be said to be proportional to $d_1/S$ and $d_2/S$ respectively and are substantially independent of range, are applied to individual angle tracking circuits corresponding to the aforesaid aerial axes. The angle tracking circuit for the signal $d_1/S$ comprises a switch 8a followed by an amplifier 9a, the output of which is applied to a servo motor 10a which it will be assumed is arranged to displace the aerial angularly about the respective axis. The input signal for the amplifier 9a is smoothed by a storage condenser 11a. The other angle tracking circuit is identical to that described, corresponding components being denoted by the references 8b to 11b. The switches 8a and 8b are responsive to a common relay coil 12 which is connected in the anode lead of a valve 13. This valve has a cathode impedance 14 in common with another similar valve 15 and has its control electrode connected to a point of reference voltage. The control electrode of the valve 15 receives an input signal via an amplifier 6 and a capacitor 16, from the lead 3. The input signal is thus the gain control signal for the amplifiers 2 and it is applied with such polarity that dips therein, corresponding to the incidence of the glint effect, are of negative polarity. Moreover the valve 15 is biassed at its control electrode by way of a leak resistor 17 to such a voltage relative to the reference voltage applied to the control electrode of the valve 13 that the valve 15 normally conducts to hold the valve 13 in a non-conducting state. The relay coil 12 is then de-energised and the switches 8a and 8b are closed. Under these conditions, the angle tracking circuits operate in normal manner. The time constant of the capacitor 16 and resistor 17 is moreover such that relatively slow variations in the gain control signal such as correspond to normal fading or to movement of the echo source, produce no change in the relative conducting states of the valves 13 and 15. However if a dip occurs, corresponding to the incidence of the glint effect, the conducting states of the valves are interchanged, the aforesaid time constants being such that the valves will not remain in their interchanged conducting states for substantially longer than the normal duration of the dips. While the valves remain in their interchanged conducting states, the relay coil 12 is energised and the aforesaid switches are opened to disconnect the tracking circuits from their respective error signal sources. Moreover during the period of disconnection the tracking circuits operate in response to the voltages stored in the storage condensers 11a and 11b, so that the servo motors 10a and 10b will continue to displace the aerial angularly on the basis of the pre-glint values of the error signals.

By means of the apparatus shown, the error signals for the angle tracking circuits are therefore weighted in response to the amplitude of the received echo signals, in such a way that falsification of the error signal due to glint is reduced.

In the modification of the invention illustrated in FIGURE 2, the angle tracking circuits are normal and do not include the switches 8a and 8b shown in FIGURE 1. The angle tracking circuits have not therefore been shown. The weighting of the error signals for the tracking circuits is effected by arranging that the automatic gain control circuit of the common intermediate frequency amplifier 2 is frequency sensitive in such a way that the gain control signal does not follow rapid fluctuations in the amplitude of the sum signal from which the gain control signal is derived. Thus as shown in FIGURE 2, a resistor 20 is included in the lead for the gain control signal from the discriminator circuit 5 to the amplifier 2. The resistor is shunted by a unilaterally conducting device 21 and a capacitor 22 is connected from ground to that junction of 20 and 21 which is nearer the amplifier 2. The automatic gain control signal for the amplifier 2 is therefore developed across the capacitor 22. The conducting direction of the unilaterally conducting device 21 is selected in relation to the polarity of the automatic gain control signal in such a way that the change corresponding to the leading edge of a dip produces only a slight change in the automatic gain control signal across the capacitor 22. When the change occurs corresponding to the trailing edge of a dip, a relatively rapid change in the automatic gain control signal across the capacitor 22 can occur by virtue of the device 21, but as the voltage across the capacitor 22 has not departed materially from its pre-dip value, the change which now occurs is only small. In this way the automatic gain control circuit is arranged so that it is less sensitive to rapid reduction in the amplitude of the sum signal than to rapid increases in the amplitude of the sum signal and the desired weighting of the error signals for the angle tracking circuits is achieved. Furthermore switching of the automatic gain control signal may also be effected if desired.

The invention is not confined to automatic angle tracking circuits of the kind described in this specification but is generally applicable to automatic tracking circuits in which "glint" can falsify error signals.

What we claim is:

1. Radar automatic tracking apparatus comprising means for deriving a signal representing a tracking error and means for applying said tracking error signal to an automatic tracking control circuit, means for receiving a signal reflected from an object being tracked by said apparatus, means for weighting said tracking error signal in response to the amplitude of said received signal to reduce falsification of said tracking error signal due to glint.

2. Apparatus according to claim 1 comprising means for producing an automatic gain control signal in response to the amplitude of a received signal, means for variably amplifying a received signal before said tracking control circuit in response to said gain control signal, means for utilising said gain control signal for weighting the tracking error signal.

3. Apparatus according to claim 1 wherein said means for deriving a tracking error signal is responsive to the relative magnitudes of signals received from different directions.

4. Apparatus according to claim 1 wherein said weighting means comprises means for disconnecting said automatic tracking control circuit from means for deriving said tracking error signal when the amplitude of said received signal varies in a predetermined manner.

5. Apparatus according to claim 1 wherein said weighting means is responsive to reductions in the amplitude of said received signal exceeding a predetermined rapidity.

6. Apparatus according to claim 5 comprising a gain controlled amplfier for amplifying said received signal before it is applied to said automatic tracking control circuit, means being provided for controlling the gain of said amplifier in response to the amplitude of a received signal and means including a frequency-sensitive circuit whereby the gain control means is substantially insensitive to reductions in the amplitude of the received signal exceeding a predetermined rapidity.

References Cited

UNITED STATES PATENTS

| | | | |
|---|---|---|---|
| 2,449,035 | 9/1948 | Coffin, et al. | 343—7.4 |
| 2,831,969 | 4/1958 | Jankowski | 343—16.1 |
| 2,682,656 | 6/1954 | Phillips | 343—7 |

RODNEY D. BENNETT, *Primary Examiner.*

C. L. WHITHAM, *Assistant Examiner.*

U.S. Cl. X.R.

343—16